United States Patent [19]
Miller

[11] Patent Number: 5,757,992
[45] Date of Patent: May 26, 1998

[54] FIBER OPTIC COMMUNICATION SYSTEM AND METHOD

[75] Inventor: David Andrew Barclay Miller, Stanford, Calif.

[73] Assignee: Lucent Technologies Inc., Murray Hill, N.J.

[21] Appl. No.: 707,889

[22] Filed: Sep. 9, 1996

[51] Int. Cl.[6] .............................. G02B 6/28; G02F 1/295
[52] U.S. Cl. ................................................ 385/24; 385/4
[58] Field of Search ........................... 385/1, 7, 4, 10, 385/14, 12, 24, 100; 250/227.12

[56] References Cited

U.S. PATENT DOCUMENTS

| | | | |
|---|---|---|---|
| 3,991,417 | 11/1976 | Levine | 385/100 X |
| 4,436,365 | 3/1984 | Hodgins et al. | 385/12 X |
| 5,502,782 | 3/1996 | Smith | 385/4 X |
| 5,621,560 | 4/1997 | Wood | 385/14 X |

OTHER PUBLICATIONS

T.H. Wood et al., J. Lightwave Technology, vol. 6, No. 2, Feb. 1988, "Observation of Coherent Rayleigh Noise in Single–Source Bidirectional Optical Fiber Systems", pp. 346–352.

P.F. Barbara et al. eds., *Ultrafast Phenomena IX: Proceedings of the 9th International Conference,* Dana Point, CA, May 2–6, 1994, 60 Series in Chemical Physics (Springer–Verlag, New York, 1995), pp. 3–16, 39–43, 159–220.

*Primary Examiner*—Akm E. Ullah

[57] ABSTRACT

A single fiber communication system which uses a short pulse light source in conjunction with a short pulse detector. The short pulse source transmits a short pulse carrier signal that is passed down an optical fiber to a reflective modulator. The reflective modulator imparts a modulation to the carrier and reflects it back up the fiber where it is detected by the short pulse light detector. Through the use of short pulses the invention is able to overcome the problem of fiber reflection. The reflected modulated pulse is easily separated from the undesired reflections from the fiber, thereby eliminating noise in the detected signal and increasing the effectiveness of the single fiber system.

17 Claims, 2 Drawing Sheets

FIBER OPTIC COMMUNICATION SYSTEM AND METHOD

FIELD OF INVENTION

This invention relates to fiber optics, and more particularly to the use of short pulse light in single fiber type communication systems.

BACKGROUND OF THE INVENTION

Single fiber type communication systems are well known in the art of fiber optics. In a typical single fiber system, light generated by a light source is guided to a reflective modulator by an optical fiber. The source light (or "carrier signal") is modulated at the reflective modulator by an information signal, resulting in a modulated carrier signal (or "modulated signal"). The modulated signal is passed back down the optical fiber to a beam splitter that redirects the signal toward an optical detector which demodulates the signal to extract the information.

In contrast to single fiber systems, conventional fiber systems do not make use of reflective modulators. In a conventional system, the carrier signal is modulated at the source. Thus, in a conventional system the source and modulator may be, for example, a single unit, or a pair of units connected in series. The single fiber systems discussed above possess many advantages over conventional systems.

Since single fiber type systems employ a light source that is remote from the modulator, it is possible build a single fiber system in which a single light source is used in conjunction with multiple modulators to generate many distinct modulated signals. For example, a single light source may be directed at openings in several optical fibers, each fiber being coupled to a reflective modulator. Each modulator may then modulate the carrier signal according to a distinct information signal, thereby creating several distinct modulated signals. To achieve the same result, the designer of a conventional system would have to employ several distinct light sources and suffer the attendant cost and complexity of employing more than one light source. Moreover, reflective modulators may be made relatively large, and therefore easy to align to fiber. Whereas, the light source/modulator combinations of conventional systems are generally difficult to align to fiber.

In view of the above-mentioned advantages of single fiber communication systems, such systems are often preferred over conventional fiber systems. However, single fiber systems are known to have a key problem, as discussed in the article "Observation of Coherent Rayleigh Noise in Single-source Bi-directional Optical Fiber Systems" by T. H. Wood, R. A. Linke, B. L. Kasper and E. C. Carr in the Journal of Lightwave Technology, volume 6, number 2, February 1988, pp. 346–352. The problem is that unmodulated source light—as distinguished from the modulated signal—is reflected back toward the source by the fiber. This unintentionally reflected light from the fiber interferes with the intentionally reflected light from the modulator at the position of any detector intended to detect the intentionally reflected light. Thus, giving rise to undesired noise in the detection process, and thereby reducing the effectiveness of single fiber systems.

SUMMARY OF THE INVENTION

It has been recognized that the problem of undesired reflections in single fiber systems can be overcome by using a light source capable of generating short pulses of light and a detector capable of detecting those short pulses.

A short pulse light source transmits a short pulse carrier signal that is passed down a fiber optic transmission line to a reflective modulator. The reflective modulator imparts a modulation to the carrier to create a short pulse modulated signal, and reflects that short pulse modulated signal back up the fiber toward a short pulse light detector. Through the use of short pulses the invention is able to overcome the problem of fiber reflections.

Fiber reflections refer to the reflections of the carrier light by the fiber optic transmission line that occur as the carrier is travelling down the line toward the modulator. Since the fiber is a poor reflector, these reflections are spread out in time and of low magnitude, and therefore not well defined. By contrast, the reflected modulated pulse will be of relatively short duration and of relatively high magnitude. Thus, the reflected modulated pulse of the invention is easily separated from the fiber reflections, thereby eliminating noise in the detected signal and increasing the effectiveness of the single fiber system.

DETAILED DESCRIPTION

Figure 1:
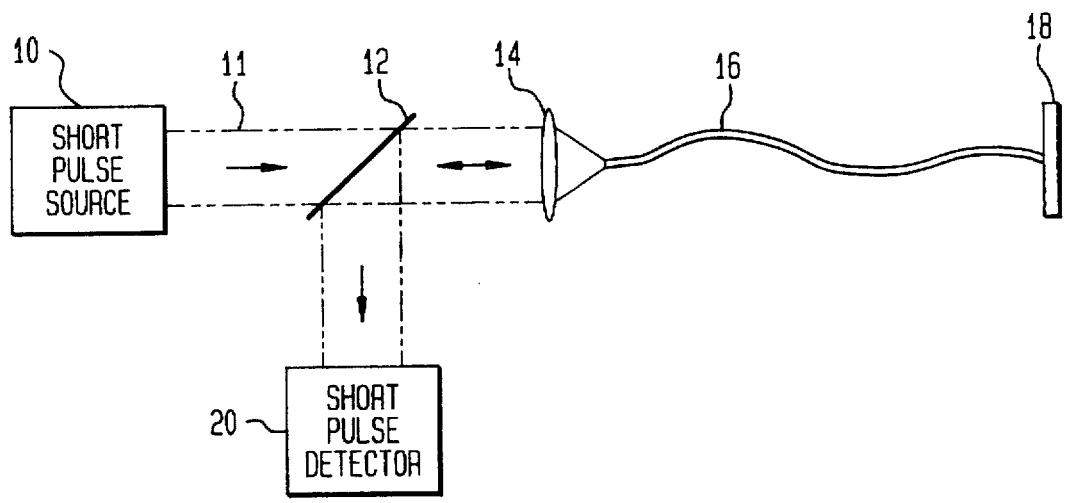
FIG. 1 is a schematic diagram of a fiber optic communication system in accordance with the principles of the invention.

FIG. 1 shows a fiber optic communication system in accordance with the principles of the invention. As can be seen from the figure, the system includes a short pulse light source 10, a single fiber optic transmission line 16, a reflective modulator 18, and a short pulse light detector 20. Through the use of short pulse light the system is able to distinguish signals reflected by the reflective modulator from noise signals reflected by the fiber.

The system of FIG. 1 operates as follows. The short pulse light source 10 emits a short pulse carrier signal 11 in the form of a short pulse light beam (or "source beam"). The short pulse carrier signal is directed toward a beam splitter 12 which is designed to allow transmission of the source light. The carrier signal passes through the beam splitter and is incident upon a lens 14 which focuses the source beam onto an opening in the fiber. The source beam propagates down the fiber to the reflective modulator. The reflective modulator encodes an information bearing signal onto the carrier, creating a short pulse modulated signal (or "modulated beam"), and reflects it back up the fiber. The reflected short pulse modulated signal exits the fiber and is incident upon the lens which collimates the modulated beam and directs it toward the beam splitter. The beam splitter is designed to reflect the modulated beam and is spatially oriented so that the modulated beam is directed toward the short pulse detector. Once the short pulse modulated signal is detected by the short pulse detector, it may be decoded to extract the information bearing signal.

The system of FIG. 1 overcomes the problem of interference due to reflections from the inner volume of the fiber. FIGS. 2A–2D illustrate how the system's use of short pulse light overcomes the interference problem. For the purpose of showing direction of propagation, FIGS. 2A–2D include a source 24 and a reflective modulator 26.

Figure 2A:
FIG. 2A is a signal diagram that illustrates a short pulse carrier signal in accordance with the invention.

FIG. 2A shows an exemplary short pulse generated by short pulse source 10. These short pulses will generally have durations in the range of 1 nanosecond to 5 femtoseconds. There are many well known methods of making sources capable of generating such short pulses. Many examples of such methods are discussed in *Ultrafast Phenomena IX: Proceedings of the 9th International Conference*, Dana Point, Calif., May 1–5, 1994, in 60 SERIES IN CHEMICAL PHYSICS (Paul F. Barbara et al. eds., Springer-Verlag, New York, 1995).

Figure 2B:
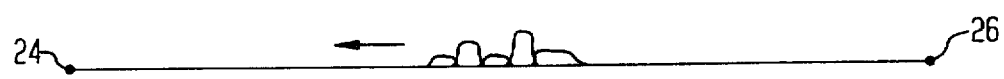
FIG. 2B is a signal diagram that illustrates the discreet undesired reflections which occur in a single fiber system.
Figure 2C:
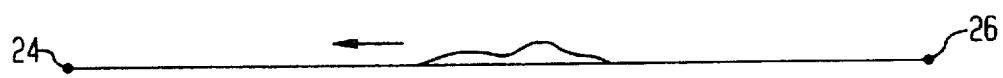
FIG. 2C is a signal diagram that illustrates how the undesired reflections which occur in a single fiber system may be modeled as a single signal.
Figure 2D:
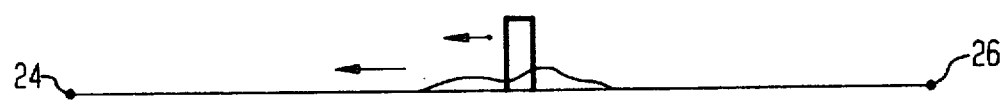
FIG. 2D is a signal diagram that illustrates a reflected short pulse modulated signal in accordance with the invention superimposed on a signal representing the undesired reflections of a single fiber system.

As discussed above, the short pulse of FIG. 2A propagates toward the reflective modulator and is partially reflected by the inner volume of the fiber. This fiber reflection does not occur at a single point in the fiber, but rather, occurs at all points along the length of the fiber. The continual reflections along the fiber may be modeled as a series of overlapping discrete reflections, as illustrated in FIG. 2B. One may then view the fiber reflections as the sum of these discrete reflections. FIG. 2C depicts the sum of the discrete reflections of FIG. 2B. FIG. 2D shows the returning short pulse of FIG. 2A superimposed on the reflection signal of FIG. 2C. Since the fiber is designed to prevent undesired reflections, the amplitude of the fiber reflection is well below that of the short pulse. It should be noted that for purposes of illustration no attempt has been made to show the modulation imparted on the short pulse by the reflective modulator.

Thus, as can be seen from FIG. 2D the task of detecting the reflected modulated short pulse becomes that of distinguishing between the pulse and the relatively low level, long duration, fiber reflection. There are at least two general types of short pulse light detectors that can be used for this purpose: (1) detectors that respond only to high intensity light (or "high intensity detectors"), and (2) detectors that respond only during a particular time period (or "gated detectors").

There are several ways of making high intensity detectors. One way is to build a detector that does not respond to single photon absorption, but does respond to two photon absorption. A Gallium-arsenide (GaAs) photodiode may serve as the basis for such a detector. For light of a wavelength at or near 1.5 um, GaAs has too large a bandgap to respond significantly to single photon absorption. However, with sufficiently intense light of the same wavelength, GaAs will simultaneously absorb pairs of photons to generate a signal. Thus, it is possible to build a GaAs based detector that responds to light of a given wavelength only when that light is sufficiently intense.

Another way to make a high intensity detector is by using a saturable absorber. The saturable absorber is placed in front of a conventional detector, such that light incident on the detector must first pass through the absorber. Saturable absorbers are substantially absorbing at low intensities and substantially transparent at high intensities. Thus, placing a saturable absorber element in front of a conventional detector allows intense signals to reach the detector but blocks low level signals, thereby creating a high intensity detector.

A third way to build a high intensity detector is by making use of second harmonic generation. To realize a high intensity detector through second harmonic generation, a nonlinear optical crystal and a high-pass optical filter are employed. The crystal and filter are placed in the path of light that is directed toward a conventional detector, such that the light is incident on the crystal first, then on the filter, and finally on the detector. When the light is of sufficient intensity the crystal will generate the second harmonic of the light. Accordingly, light incident on the filter will include light of the original wavelength plus the second harmonic of that light. The filter is designed to reject light having the original wavelength and to allow light having a wavelength of the second harmonic through, thereby permitting only the second harmonic to reach the detector. Thus, only intense light is detected because only intense light generates a second harmonic that will pass through the filter.

In an example of a high intensity detector of the second harmonic type, a conventional detector is used in conjunction with source light having a wavelength of 1.5 um, a nonlinear crystal, and a filter that transmits only wavelengths shorter than 800 nm. Low level source light passes through the crystal unaltered and is blocked by the filter. However, intense source light passing through the crystal generates a second harmonic, or 750 nm wavelength light, which passes through the filter and is incident upon the conventional detector.

As mentioned above, a second general type of short pulse detector is the gated detector. A gated detector is responsive to signals incident upon it only during a particular time period, the time period coinciding with the arrival time of the pulse to be detected, e.g. the arrival time of a pulse reflected by a reflective modulator.

There are many well known ways of making gated detection systems. One way is to gate the output of a detector. For pulses longer than about 100 ps, electronic circuits may be used to gate the output. For pulses shorter than about 100 ps, optical triggering of a photoconductive sampling gate may be used. Another way of making a gated detection system is to gate the output of an amplifier that follows the detector, in which case either electronic or optical gating may be used.

Figure 3:
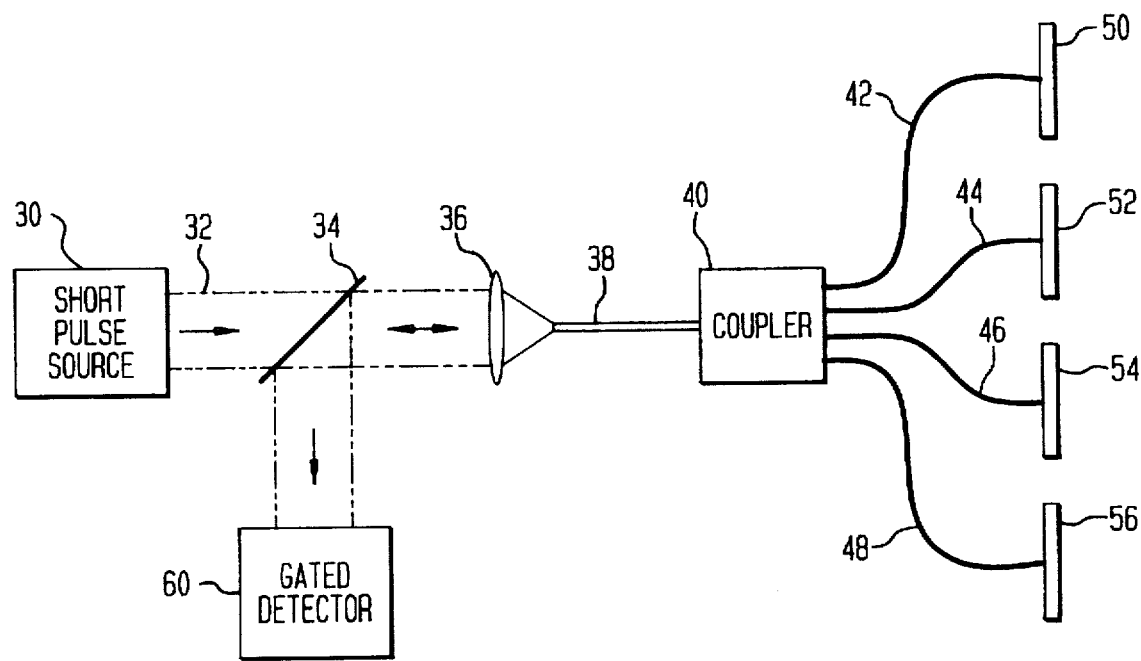
FIG. 3 is a schematic diagram of a star-coupled fiber optic communication system in accordance with the principles of the invention.

FIG. 3 shows an alternative fiber optic communication system according to the present invention, in which a gated detector 60 is used to discriminate between pulses from several reflective modulators. The system of FIG. 3 is a multiplexed system in which many optical signals may be created by a single source and detected by a single detector. As can be seen from the figure, the system includes a short pulse light source 30 that emits a carrier signal 32 in the form of a short pulse light beam (or "source beam"). The short pulse carrier signal is directed toward a beam splitter 34 which is designed to allow transmission of the source light. The carrier signal passes through the beam splitter and is incident upon a lens 36 which focuses the source beam into a first opening in a main fiber 38. The main fiber has a second opening which is coupled to an optical coupler 40. The coupler splits the source beam among four fibers 42, 44, 46 and 48, and thus it has five ports—one for coupling to main fiber 38 and four for coupling to fibers 42–48. It should be noted that the four way coupler is merely illustrative. In practice, the source beam may be split as many ways as desired, either through the use of a single coupler, or many couplers.

In any event, fibers 42–44 are coupled to reflective modulators 50–56, respectively. Each reflective modulator encodes an information bearing signal onto the carrier, creating a modulated signal (or "modulated beam"). Thus, four short pulse modulated signals are created, each one encoded with different information. The modulated pulses are reflected back toward the coupler by the reflective modulators 50–56. The coupler channels the pulses back into the main fiber which, in turn, directs the pulses back through the lens and on to the beam splitter. Finally, the beam splitter reflects the pulses toward the gated detector where detection of the pulses and extraction of the encoded information can be performed.

To keep the modulated pulses in the FIG. 3 system from interfering with one another, the time of the reflected modulated pulses' arrival at the coupler is varied. This is done by varying the length of fibers 42–48. The amount of time it takes a pulse to travel from the coupler to its associated reflective modulator and back is directly proportional to the length of the fiber associated with that pulse, and therefore varying the length of the fibers varies the times at which the pulses return to the coupler. Once the pulses return to the coupler the remainder of the path they travel is identical. Therefore, the relative timing of pulses created by the various fiber lengths remains the same as the pulses travel from the coupler to the gated detector. Thus, when the gated detector is tuned according to the fiber lengths it is possible to distinguish between the reflected modulated pulses.

Two factors that may negatively impact the performance of the systems depicted in FIGS. 1 and 3 are fiber dispersion and fiber nonlinearities. Fiber dispersion, which tends to spread optical pulses in time, may be compensated for through many well known techniques, such as the use of prisms or gratings. Fiber nonlinearities, which have a greater effect as pulse intensity increases, may be compensated for through pulse expansion techniques. Pulses may be expanded prior to entering the fiber and recompressed prior to entering the detector. The recompression will not effectively compress fiber reflections and thus will not negatively impact the signal to noise ratio.

While the best mode for carrying out the invention has been described in detail, those familiar with the art to which the invention relates will recognize various alternative designs and embodiments for practicing the invention as defined by the following claims.

I claim:

1. A fiber optic communication system, comprising:
   a short pulse light source for generating a short pulse carrier signal;
   a reflective modulator for modulating said short pulse carrier signal according to an information bearing signal to create a short pulse modulated signal, and for reflecting said short pulse modulated signal;
   means for conveying said short pulse carrier signal to said reflective modulator, and for conveying said reflected short pulse modulated signal from said reflective modulator; and
   a short pulse detector for detecting said reflected short pulse modulated signal.

2. A fiber optic communication system according to claim 1, wherein said means for conveying is a fiber optic transmission line.

3. A fiber optic communication system according to claim 2, further comprising a lens for directing said short pulse carrier signal into said fiber optic transmission line.

4. A fiber optic communication system according to claim 1, further comprising a beam splitter for directing said reflected short pulse modulated signal toward said short pulse detector.

5. A fiber optic communication system according to claim 1, wherein said short pulse detector is a high intensity detector.

6. A fiber optic communication system according to claim 1, wherein said short pulse detector is a gated detector.

7. A fiber optic communication system, comprising:
   a short pulse light source for generating a short pulse carrier signal;
   a plurality of reflective modulators for modulating said short pulse carrier signal according to one or more information bearing signals to create a plurality of short pulse modulated signals, and for reflecting said short pulse modulated signals;
   means for conveying said short pulse carrier signal to said reflective modulators, and for conveying said reflected short pulse modulated signals from said reflective modulators; and
   a short pulse detector for detecting said reflected short pulse modulated signals.

8. A fiber optic communication system according to claim 7, wherein said means for conveying comprises:
   a main fiber optic transmission line;
   a plurality of secondary fiber optic lines; and
   a coupler for coupling said main fiber optic transmission line to said secondary fiber optic transmission lines.

9. A fiber optic communication system according to claim 8, further comprising a lens for directing said short pulse carrier signal into said main fiber optic transmission line.

10. A fiber optic communication system according to claim 7, further comprising a beam splitter for directing said reflected short pulse modulated signals toward said short pulse detector.

11. A fiber optic communication system according to claim 7, wherein said short pulse detector is a high intensity detector.

12. A fiber optic communication system according to claim 7, wherein said short pulse detector is a gated detector.

13. A fiber optic communication system according to claim 8, wherein said secondary fiber optic transmission lines are of varying lengths so that the time of arrival of each said reflected short pulse modulated signal at said short pulse detector is varied from pulse to pulse.

14. A fiber optic communication system according to claim 13, wherein said short pulse detector is a gated detector that is tuned according to the times of arrival of said short pulse modulated signals.

15. A method of fiber optic communication, comprising the steps of:
   generating a short pulse carrier signal;
   transmitting said short pulse carrier signal to a reflective modulator;
   using said reflective modulator to modulate said short pulse carrier signal according to an information bearing signal to create a short pulse modulated signal, and to reflect said short pulse modulated signal toward a short pulse detector; and
   detecting said reflected short pulse modulated signal at said short pulse detector.

16. A method of fiber optic communication according to claim 15, wherein the step of transmitting said short pulse carrier signal comprises the steps of:
   providing a fiber optic transmission line having at least a first opening and a second opening and coupling said reflective modulator to said second opening; and
   focusing said short pulse carrier signal into said first opening in said fiber optic transmission line for conveyance to said reflective modulator.

17. A method of fiber optic communication according to claim 15, further comprising the step of directing said reflected short pulse modulated toward said short pulse detector through the use of a beam splitter.

* * * * *